US006483559B1

(12) United States Patent
Hiraki et al.

(10) Patent No.: US 6,483,559 B1
(45) Date of Patent: Nov. 19, 2002

(54) REFLECTION TYPE LIQUID CRYSTAL DISPLAY WITH LAYER COMPRISING LIQUID CRYSTAL COMPOUND AND LIQUID CRYSTAL POLYMER BEING TWIST-ALIGNED

(75) Inventors: Hajime Hiraki, Ichikawa (JP); Shun Ueki, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/452,411

(22) Filed: Dec. 1, 1999

(30) Foreign Application Priority Data

Dec. 1, 1998 (JP) .......................................... 10-340902

(51) Int. Cl.[7] .................................................. G02F 1/13
(52) U.S. Cl. ........................... 349/86; 349/113; 349/180
(58) Field of Search ........................... 349/113, 98, 183, 349/180, 86, 94, 92

(56) References Cited

U.S. PATENT DOCUMENTS 6,072,553 A * 6/2000 Mitsui et al. ................ 349/113
6,025,895 A * 12/2000 Yazaki et al. .................. 349/86
6,160,597 A * 12/2000 Schadt et al. .................. 349/98

* cited by examiner

*Primary Examiner*—Kenneth Parker
(74) *Attorney, Agent, or Firm*—Dike, Bronstein, Roberts & Cushman; David G. Conlin

(57) ABSTRACT

A reflective liquid crystal display device includes: a liquid crystal layer in a cell; a polarizer disposed in front of the liquid crystal layer; a reflector disposed behind the liquid crystal layer; and a quarter-wave plate disposed between the liquid crystal layer and the reflector, the liquid crystal layer including a liquid crystal and a liquid crystalline polymer which are twisted in molecule alignment so as to have a twist angle X represented by $X=(45°+90° \cdot n)\pm10°$ (n=0 or a positive integer).

9 Claims, 11 Drawing Sheets

REFLECTION TYPE LIQUID CRYSTAL DISPLAY WITH LAYER COMPRISING LIQUID CRYSTAL COMPOUND AND LIQUID CRYSTAL POLYMER BEING TWIST-ALIGNED

CROSS-REFERENCE TO RELATED APPLICATION

This application is related to Japanese application No. Hei 10(1998)-340902 filed on Dec. 1, 1998, whose priority is claimed under 35 USC §119, the disclosure of which is incorporated by reference in its entirety.

BACKGROUND OF THE INVENTION

1. Field of the Invention

The present invention relates to a reflective liquid crystal display, and, in particular to a reverse mode polymer-dispersed liquid crystal display, wherein the display comprises a display medium made of a liquid crystal and a liquid crystalline polymer, molecules of the liquid crystalline polymer and liquid crystal aligned in the same orientation to form a network structure, and the display can transmit light when no voltage is applied thereto and can scatter light when a voltage is applied thereto.

2. Description of the Related Art

Recently, as a result of social needs for energy saving, low power consumption is required of display devices, too. This trend is also applied to liquid crystal display devices which are inherently non-light emitting type and consume less power as compared with CRT or the like. Therefore, development works have been increasingly active with reflective color liquid crystal display devices in order to achieve much more reduced power consumption.

However, the reflective color liquid crystal display devices are currently inferior to transmissive liquid crystal display devices, CRTs and the like in brightness, display quality, color reproductivity and the like. Therefore, the reflective color liquid crystal display devices capable of higher quality image representation are needed.

As one possible solution to this need, polymer-dispersed type liquid crystal (hereinafter referred to as twisted reverse-mode PDLC) has been proposed which is prepared by blending an acrylic monomer or oligomer having a photopolymerizing liquid crystal skelton (hereinafter referred to as liquid crystalline monomer and liquid crystalline oligomer respectively) with a host liquid crystal; injecting the blend into a cell that has undergone alignment process; twisting the blend in a specific orientation and finally subjecting the blend to UV irradiation to polymerize the liquid crystalline monomer or oligomer.

When a voltage is applied to the twisted reverse mode PDLC, the host liquid crystal changes its alignment orientation along the resultant electric field. However, the alignment orientation of the liquid crystalline polymer that has been polymerized and immobilized remains unchanged. As a result, mismatching in reflectivity occurs on the interface between the liquid crystal molecule and liquid crystalline polymer, leading to a light scattering phenomenon that features strong anisotropy in a particular orientation (see Japanese Unexamined Patent Application No. Hei 7(1995)-36022, and H. Kobayashi et al., Seiko Epson Corp., SID97, pp751–754).

Compared with conventional PDLCs that involve liquid crystal droplet structure, the above-mentioned twisted reverse mode PDLC has a greater proportion of liquid crystal component relative to liquid crystalline monomer or oligomer (usually, the approximate ratio of liquid crystalline monomer or oligomer to liquid crystal is 2:8 to 1:9), and, as a result, can be driven by a lower voltage. Capitalizing on this feature, a reflective color liquid crystal display device was proposed (see, T. Sonehara et al., Seiko Epson Corp., SID97, pp1023–1026).

A reflective color liquid crystal display device based on the above-mentioned twisted reverse mode PDLC mode is capable of bright image representation since it does not involve a polarizer. However, this device type is essentially incapable of black representation, and its image representation quality is greatly dependent on the surrounding lighting environments. More specifically, in a lighting environment where the main component of incident light is a light beam with strong directivity (for example, in the outdoors in a sunny day), the device provides relatively bright image representation of higher contrast; in contrast, its image representation quality significantly deteriorates in a lighting environment where light comes from all directions (for example, in the outdoors in a cloudy day, or in a room).

To remedy this drawback, a single-polarizer twisted reverse mode PDLC was proposed which contains an addition of one polarizer and one or more phase plates (see, Japanese Unexamined Patent Application No. Hei 7(1995)-218905). Basically, in this PDLC, when no voltage is applied to the device, liquid crystalline polymer molecules with liquid crystal skeltons and liquid crystal molecules are twisted in a common orientation, thereby the device remains transparent. In contrast, when a voltage exceeding a Freedericksz transition point is applied to the device, the liquid crystal molecules alone are oriented along the resultant electric field, causing mismatching in reflectivity between the liquid crystalline polymer molecules and the liquid crystal molecules, leading to light scattering.

The single polarizer and phase contrast films are arranged such that linearly polarized light incoming through the single polarizer is converted into circularly polarized light at a reflective plane owing to the phase plates as well as a birefringence effect of a composite layer formed of the twisted liquid crystal molecules and liquid crystalline polymer molecules (hereinafter referred to as twist PDLC layer). As a result of this arrangement, the linearly polarized light incoming through the polarizer is reflected as circularly polarized light from the reflection plane, and, when reaching the polarizer again, it is transformed into linearly polarized light with a plane of polarization that squarely intersects the transmission axis of the polarizer, and is absorbed, thereby the device becomes capable of black representation.

In contrast, when the liquid crystal molecules are oriented along the electric field owing to an applied voltage, linearly polarized light having passed the polarizer is scattered by the twist PDLC layer with the plane of polarization maintained before it is converted into circularly polarized light, and is further scattered by the reflective plane. Because the light is reflected by the reflective plane in a polarized state near linear polarization, it can again pass the polarizer, thereby device becomes capable of white representation. To attain satisfactory black and white representation using a reflective color liquid crystal display device of this configuration, it is necessary to design the twist PDLC layer in order to determine the retardation values ($\Delta n \cdot d$=birefringence of liquid crystal $\Delta n \times$layer thickness d) that allows the incoming linearly polarized light to be converted into circularly polarized light at the reflective plane with the device having a transparent state.

Incidentally, to realize brighter white representation, it is necessary to increase the difference in refractive index between the liquid crystal and liquid crystalline polymer so as to enhance light scattering performance. To improve black representation, it is necessary to decrease $\Delta n \cdot d$ or increase the twist angle of twist PDLC layer. The previously mentioned Japanese Unexamined Patent Application No. 218905/1995 discloses that the ideal combination for this purpose ($\Delta n$, d, twist angle) is (0.088, 2.3 µm, 63 degrees) or (0.25, 2.2 µm, 200 degrees).

However, a liquid crystal material with $\Delta n=0.88$ cannot achieve sufficient light scattering characteristics and brighter white representation. Thus, the similar material seems not to be readily used in practical application. When a liquid crystal material whose $\Delta n=0.25$ is used to realize bright white representation, the twist angle must be 200 degrees. A greater twist angle will, as shown later in Table 1 and FIG. 7 lead to loss in brightness when viewed in front of the display. Thus, this arrangement will have difficulty in providing brighter white representation. As described above, it is currently difficult to determine an optimal combination of conditions that satisfies not only $\Delta n \cdot d$ for achieving satisfactory black representation but also a greater $\Delta n$ for attaining brighter white representation.

SUMMARY OF THE INVENTION

The present invention is intended to solve these problems. Therefore, it is the object of the invention to provide a reflective liquid crystal display device that realizes both brighter white representation and satisfactory black representation, by adopting a configuration that is capable of black representation, based on the optical rotating power of the twist PDLC layer.

To achieve the above-mentioned object, the present invention realizes black representation by using the rotary polarization where the plane of polarization of the linearly polarized light arriving at the twist PDLC layer rotates, rather than by based on the phase shift effect that occurs when incident light passes the twist PDLC layer.

The present invention provides a reflective liquid crystal display device comprising: first and second substrates opposed to each other; a liquid crystal layer sandwiched between the first and second substrates, the liquid crystal layer including a polymer-dispersed liquid crystal containing a liquid crystal and a liquid crystalline polymer; a transparent electrode interposed between the first substrate and liquid crystal layer; a quarter-wave plate interposed between the liquid crystal layer and second substrate; a reflective electrode interposed between the quarter-wave plate and second insulating substrate; and a polarizer disposed on the opposite side of the first substrate from the liquid crystal layer; wherein the liquid crystal and the liquid crystalline polymer are twisted in molecule alignment so as to have a twist angle X represented by $X=(45°+90° \text{ n}) \pm 10°$ (n=0 or a positive integer).

PREFERRED EMBODIMENT OF THE INVENTION

The device configuration that comprises a single polarizer, twist PDLC layer, quarter-wave plate, and reflector laminated in this order as viewed from an observer side can exhibit satisfactory black representation by selecting the twist angle of the twist PDLC layer corresponding to a formula $45°+90°\times n\pm10°$ (n is 0 or a positive integer), even if the $\Delta n \cdot d$ of the twist PDLC layer is greater.

The display principle with the reflective liquid crystal display device of the present invention is hereunder described in detail. First, when a voltage is applied to the device, linearly polarized light scattered by the twist PDLC layer arrives at the quarter-wave plate in parallel with the slow phase axis (or fast phase axis) of the quarter-wave plate, and is reflected by the reflective electrode as the reflected light remains linearly polarized. The reflected light is again scattered by the twist PDLC layer, but can pass the polarizer since it still essentially maintains a plane of polarization that is parallel with the transmission axis of the polarizer, thereby white representation is realized.

When no voltage is applied to the device, incoming linearly polarized light having passed the polarizer rotates its plane of polarization along the twist on PDLC layer and arrives at the quarter-wave plate at about 45° with respect to the slow phase axis (or fast phase axis) of the quarter-wave plate. The linearly polarized light arriving at the quarter wave plate is transformed into circularly polarized light when reaching the reflective electrode. The circularly polarized light reflected by the reflective electrode again passes the quarter-wave plate and twist PDLC layer to be converted into linearly polarized light across to the transmission axis of the polarizer and absorbed by the polarizer, thereby black representation is realized.

Because of the above-mentioned optical principle, the $\Delta n \cdot d$ of the twist PDLC layer is required only to satisfy the Mauguin condition ($\Delta n \cdot d > \lambda$) that leads to optical rotating power. By this arrangement, the requirements on the optical condition for the twist PDLC layer are much alleviated, thereby a liquid crystal material and liquid crystalline polymer whose Δn is greater can be used to enhance scattering efficiency and realize brighter image representation.

Figure 7:
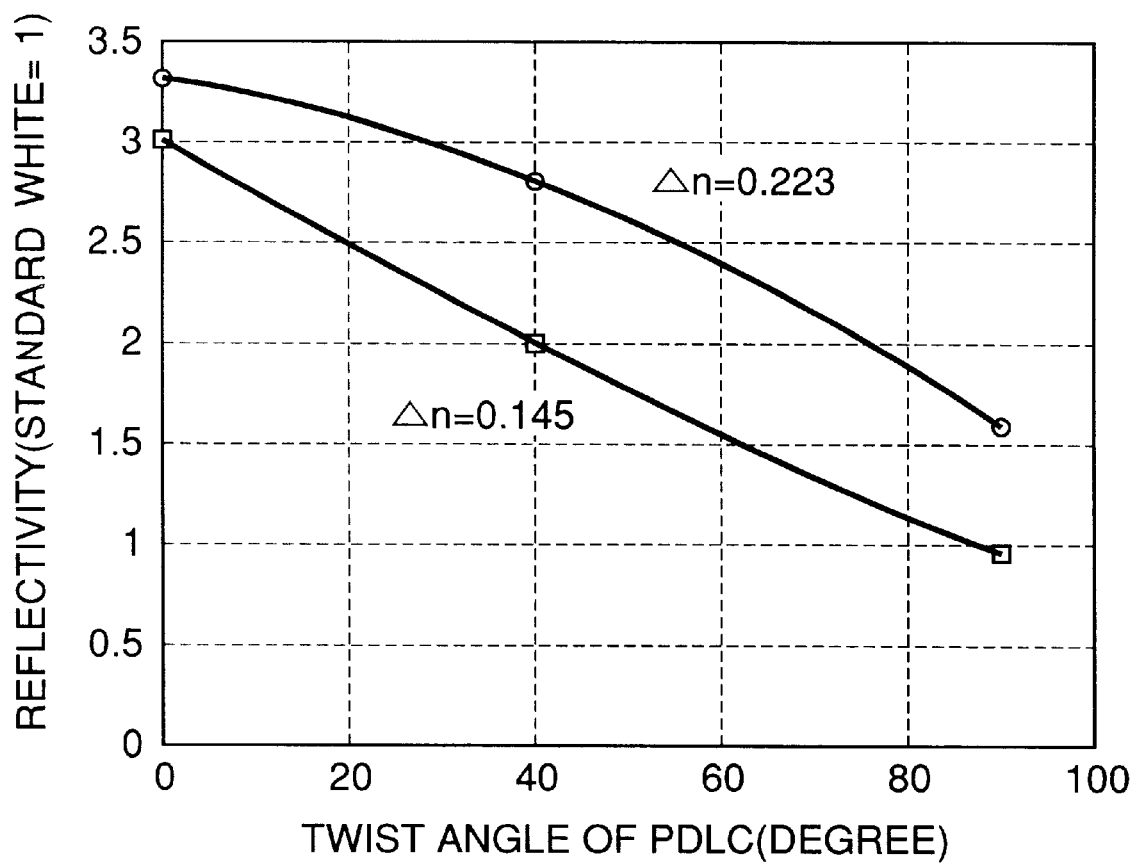
FIG. 7 is a graphical plotting illustrating the correlation between the brightness and $\Delta n$ of liquid crystal material with a twisted reverse mode PDLC used for the reflective liquid crystal display device of the invention.

FIG. 7 and Table 1 illustrate a dependency in brightness of a twisted reverse mode PDLC on Δn of a liquid crystal material. Since this dependency is basically evaluated by observing the effect of Δn on the scattering performance of a twisted reverse mode PDLC, the device is not provided with a polarizer and quarter-wave plate. Also, the evaluation was achieved using the evaluation system shown in FIG. 5, wherein the brightness was measured by throwing a light beam at a incident angle of 30 degrees on a sample and receiving a reflective light beam at a reflective angle of 0 degree. As can be understood from FIG. 7, the brightness becomes lower as the twist angle of the twisted reverse mode PDLC is increased.

Additionally, evaluation of twisted reverse mode PDLCs prepared using two liquid crystal material types each having unique Δn (material A from MERCK: commercial name TL213, Δn=0.223; material B from MERCK: commercial name MS93392, Δn=0.145) has revealed that a liquid crystal material of a greater Δn contributes to greater brightness at every twist angle. Thus, it is possible to increase brightness by using a liquid crystal material of a greater Δn. When fabricating a reflective liquid crystal display device using a twisted reverse mode PDLC, it is advantageous to employ a liquid crystal material of a greater Δn. However, for a reflective liquid display device that is constructed to offer black representation based on the birefringence effect of a twist PDLC layer, the value of Δn·d of the twist PDLC layer that allows satisfactory black representation is preferably 300 nm, and, therefore, it is difficult to use a liquid crystal material of a greater Δn for this purpose.

TABLE 1

DEPENDENCY ON Δn IN BRIGHTNESS

| Liquid crystal material used | | Twist angle | | |
|---|---|---|---|---|
| | | 0° | 45° | 90° |
| Material A | TL213 from MERCK (Δn = 0.223) | 3.2 | 2.8 | 1.6 |
| Material B | MS93392 from MERCK (Δn = 0.145) | 3.0 | 2.0 | 0.9 |

Standard white plate = 1

Therefore, the inventors have realized bright white representation and satisfactory black representation with the reflective liquid crystal display device of the invention by incorporating black representation-capable configuration based on the optical rotating power of the twist PDLC layer. The display principle of the liquid crystal display device of the invention is described below. The plane of polarization of the linearly polarized light having passed through the twist PDLC layer in which the liquid crystal molecules and liquid crystalline polymer molecules are oriented in a common direction when no voltage is applied to the device is designed to form an angle of approximately 45°+90° n (n is an integer) relative to that of the scattered light that results from a varied orientation of the liquid crystal molecules when a voltage is applied to the device. The linearly polarized light having passed through the twist PDLC layer, when no voltage is applied to the device, is allowed to arrive at the quarter-wave plate at an angle roughly in the middle between the slow phase axis and fast phase axis of the quarter-wave plate while the linearly polarized light scattered by the twist PDLC layer when a voltage is applied to the device is arranged to reach the quarter-wave plate in parallel with the slow or fast phase axis of the quarter-wave plate, thereby a reflective liquid crystal display of high image representation quality can be realized which features both satisfactory black representation and bright white representation.

The present invention realizes a reflective liquid crystal display device that complies with the above-mentioned display principle, by setting the twist angle of the composite layer comprising liquid crystal and liquid crystalline polymer (hereinafter referred to as liquid crystal layer) to approximately 450°+90°×n (n is 0 or a positive integer).

One of the first and second substrates may comprise an alignment film in contact with the liquid crystal layer, the alignment film aligning the liquid crystal molecules in a orientation coinciding with a transmission axis of the polarizer, thereby this configuration causes the linearly polarized incident light having passed the polarizer to rotate along the twist of the twist PDLC layer.

One of the first and second substrates may comprise an alignment film in contact with the liquid crystal layer, the alignment film aligning the liquid crystal molecules in an orientation, with an angle of 45°±10° formed between the orientation and one of fast and slow axes of the quarter-wave plate. According to this arrangement, linearly polarized light having passed the twist PDLC layer when no voltage is applied to the device is allowed to pass the quarter-wave plate to be converted into circularly polarized light, thus satisfactory black state is realized.

Preferably, the liquid crystal layer has a retardation value larger than a wave length of visible radiation. Thereby this arrangement allows the twist PDLC layer to feature optically improved rotary polarization quality.

The quarter-wave plate may be formed by immobilizing a liquid crystalline polymer or monomer. By forming the reflective film between the first and second substrates, that is, within the liquid crystal cell, the physical distance to the twist PDLC layer acting as a light scattering medium can be minimized, thereby it is possible to prevent blur in image representation owing to parallax or color mixture where colors of adjacent pixels are mixed, thus good image representation is achieved.

The quarter-wave plate may include at least two wave plates which differ in retardation value.

The present invention also provides a reflective liquid crystal display device comprising: first and second substrates opposing to each other; a liquid crystal layer sandwiched between the first and second substrates, the liquid crystal layer including a polymer-dispersed liquid crystal containing twisted liquid crystal molecules and twisted liquid crystalline polymer molecules; a first transparent electrode interposed between the first substrate and liquid crystal layer; a second transparent electrode interposed between the second substrate and liquid crystal layer; a polarizer disposed on the opposite side of the first substrate from the liquid crystal layer; a reflective plate disposed on the opposite side of the second substrate from the liquid crystal layer: and a quarter-wave plate interposed between the second substrate and the reflective plate; wherein the twisted liquid crystal molecules and the twisted liquid crystalline polymer molecules have a twist angle X represented by X=(45°+90° n)±10° (n=0 or a positive integer). In another aspect, the present invention provides a method for manufacturing a reflective liquid crystal display device comprising the steps of: making a mixture by mixing a liquid crystal with a liquid crystalline monomer or oligomer;

aligning orientations of the liquid crystal and liquid crystalline monomer or oligomer in the same direction; performing a cure and phase separation of the mixture by irradiating the mixture with an activating light beam; and thereby polymerizing the liquid crystalline monomer or oligomer to form a polymer-dispersed liquid crystal having a network structure.

Polymers applicable to the polymer-dispersed type liquid crystal display of the present invention are formed of such precursors that have a molecular skeleton similar to liquid crystals, exhibit an orientation direction similar to the liquid crystals when mixed with the liquid crystals before polymerization and can be polymerized by heat or active rays while maintaining the orientation. For example, typically mentioned are polyacrylate and polymethacrylate having a side chain with a mesogene unit. Also mentioned are polyether derivatives polymerized from epoxy, polyethylene derivatives, polyvinyl derivatives and polystyrene derivatives polymerized from ethylenes.

The precursor does not necessarily have one polymeric group, but the precursor having multiple functional groups is also applicable, in which case the precursor becomes a cross-linked polymer.

"Liquid crystal monomer" mentioned in the present application does not necessarily exhibit liquid crystal properties by itself, but signifies monomers which have a molecular skeleton similar to the liquid crystals and exhibit a liquid crystal state when mixed with liquid crystal molecules.

Liquid crystals are originally classified in two major types of thermotropic and lyotropic liquid crystals in terms of their formation environments. The former is applicable to the liquid crystal of the present invention, but the later is not.

The preferred embodiments of the present invention are described below by referring to the drawings. Common elements in the drawings are demoted by a common numeral.

Embodiment 1

The embodiment 1 of the present invention is described by referring to FIGS. 1, 2, 3, 4 and 6.

A reflective liquid crystal display device of the invention includes an insulating substrate 1 that is made of an optically isotropic material such as a transparent glass substrate or polymer film, and a polarizer 3 located to a light incidence side (observer side) of the insulating substrate 1. On the insulating substrate 1, opposite to the polarizer 3, is formed a transparent electrode film 4 made of ITO (Indium Tin Oxide) or the like. On the surface of the transparent electrode film 4, opposite to the insulating substrate 1, is provided an alignment film 6 made of a polyimide film or the like that has undergone rubbing treatment.

On the side opposite to the insulating substrate 1, an insulating substrate 2 made of an optically isotropic material such as a transparent glass substrate or polymer film is provided in parallel with the insulating substrate 1. On the surface of the insulating substrate 2, opposite to the insulating substrate 1, is provided a reflective electrode film 5 made of aluminum or the like. On the surface of the reflective electrode film 5, opposite to the insulating substrate 1, is provided a quarter-wave plate 8 made of polymer or liquid crystalline polymer, and on this surface is provided an alignment film 9 made of polyimide or the like that has undergone rubbing treatment. These insulating substrates 1 and 2 are bonded in parallel relation together with a interspacing seal member 10.

Between the insulating substrate 1 and the insulating substrate 2 are formed a twist PDLC layer 11 that includes liquid crystal molecules 11a and polymer molecules (liquid crystalline polymer) 11b having a matrix of polymerized liquid crystal skelton. The liquid crystal molecules 11a and liquid crystalline polymer molecules 11b are oriented in a common direction and twisted in left hand direction (counterclockwise) and tilted relative the insulating substrate 1.

Figure 2:
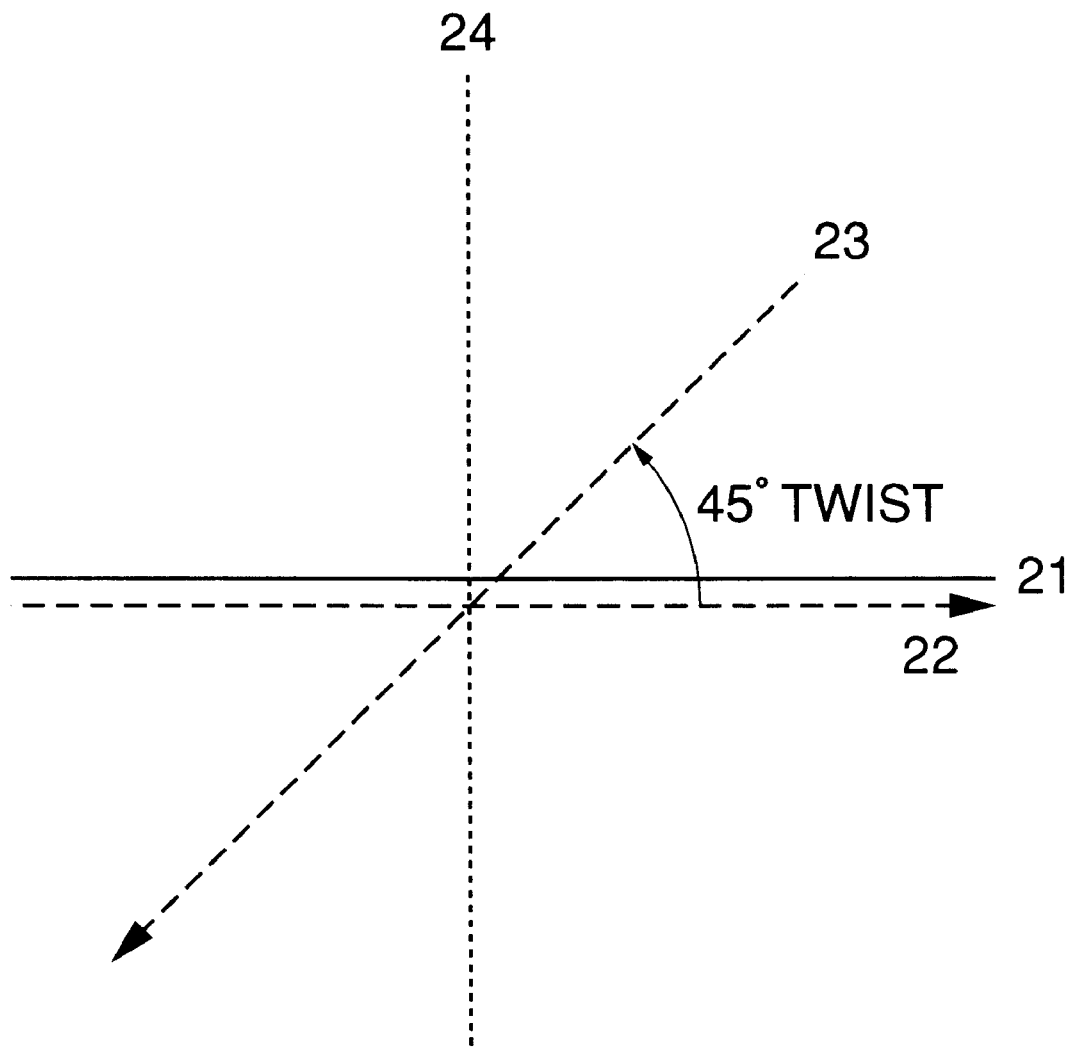
FIG. 2 is a layout drawing of the optical members and liquid crystal layer of the embodiment 1 of the present invention.

FIG. 2 shows an optical arrangement of the polarizer 3, quarter-wave plate 8 and twist PDLC layer 11. That is, FIG. 2 shows an angular distribution of these optical members relative to the transmission axis 21 of the polarizer 3 that is located on the light incident side (observer side). The orientation 22 of the twist PDLC layer 11 (that is, the rubbing direction of the alignment film 6) on the insulating substrate 1 is arranged parallel with the transmission axis of the polarizer 3. On the other hand, the orientation 23 (that is, the rubbing direction of the alignment film 9) of the twist PDLC layer on the insulating substrate 2 is twisted by +45 degrees relative to the transmission axis 21 of the polarizer 3 and the twist PDLC layer 11 is twisted by +45 degrees in left hand direction (counterclockwise). The slow phase axis 24 of the quarter-wave plate 8 is arranged parallel with the transmission axis 21 of the polarizer 3.

Figure 3A:
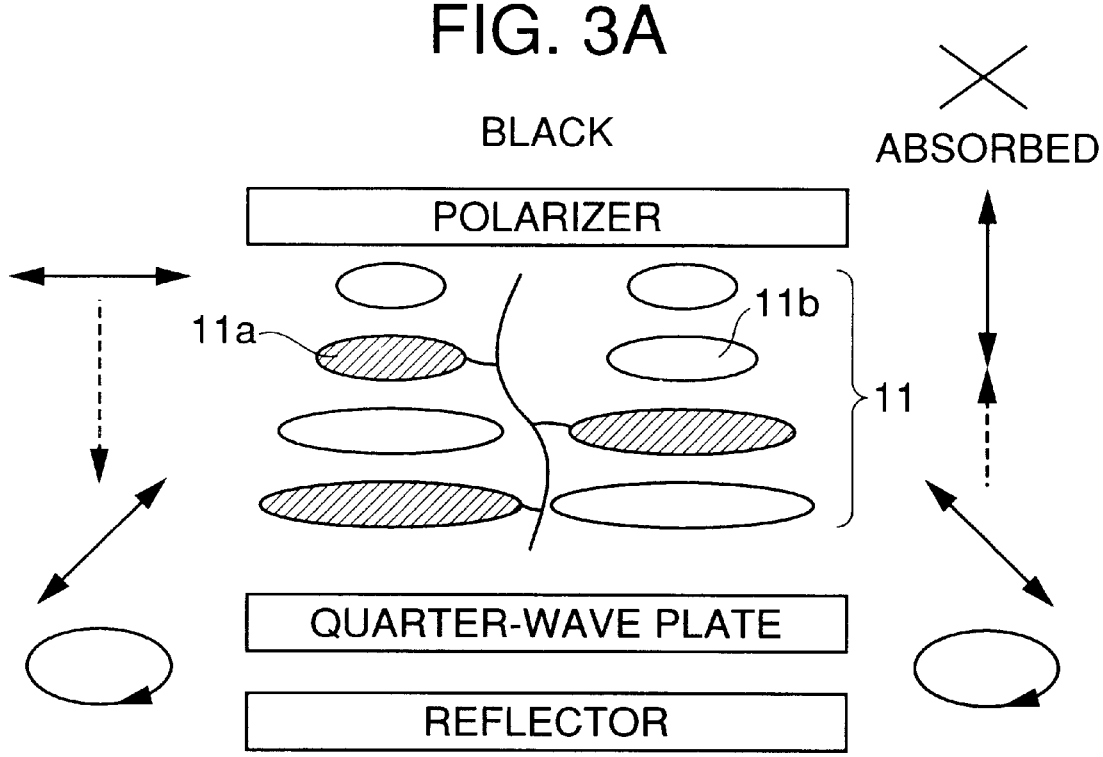
FIGS. 3A and 3B are schematic drawings illustrating the display principle of the embodiments 1 and 2 of the present invention.
Figure 3B:
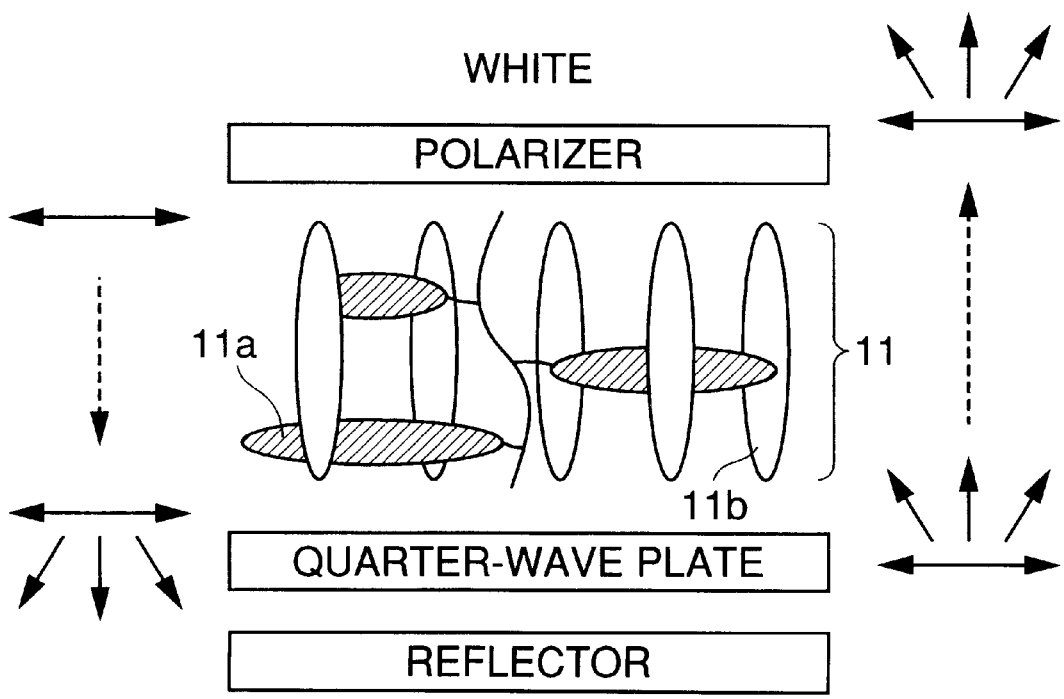

Referring now to FIGS. 3A and 3B, the display principle of the reflective liquid crystal display device of the invention is described below. When no voltage is applied to the device, as shown in FIG. 3A, both the liquid crystal molecules 11a and liquid crystalline polymer molecules 11b in the liquid crystal layer 11 remain twisted as oriented in a common direction. In this situation, the non-polarized incident light 31a involving both right-hand circularly polarized light and left-hand circularly polarized light is allowed to pass through the polarizer 3 on the incident side and thus converted into linearly polarized light 31b that enters the twist PDLC layer 11 in parallel with the orientation direction 22 of the alignment film 6 on the insulating substrate 1.

While passing through the twist PDLC layer 11, the incident light 31b rotates along the twist direction of this layer, and when exiting the twist PDLC layer 11, becomes the linearly polarized light 31c that poses an angle of +45 degrees relative to the transmission axis 21 of the polarizer 3. With its angular relation unchanged, the linearly polarized light 31c enters the quarter-wave plate 8, and, thus, passes through the quarter-wave plate 8, thereby the incident light 31d reaching the surface of reflective electrode film 5 has been converted into circularly polarized light. The circularly polarized incident light 31d is reflected by the reflective film 5 and again passes the quarter-wave plate 8 and twist PDLC layer 11, thereby converted into the linearly polarized light 41c that is angled at +90 degrees relative to the transmission axis of the polarizer 3. As a result, the outgoing light 41c is absorbed by the polarizer 3, thereby satisfactory black representation is realized.

On the other hand, when a voltage is applied to the device, as shown in FIG. 3B, the liquid crystal molecules 11a are oriented along the electric field while the orientation of the liquid crystalline polymer molecules 11b remains unchanged. As a result, discrepancy between the orientation direction of the liquid crystal molecules 11a and that of the liquid crystalline polymer molecules 11b leads to mismatching of reflectivity, causing light scattering. In this situation, the incident light 32b having been transformed into linearly polarized light by passing the transmission axis 21 of the polarizer 3 is front-scattered by the twist PDLC layer 11. The front-scattered light 32c, while remaining the linearly polarized light in parallel with the transmission axis 21 of the polarizer 3, enters the quarter-wave plate 8 in parallel with the slowphase axis 24 of the quarter-wave plate 8. As a result, the light 32d having passed the quarter-wave plate 8 reaches the reflective film 5, while remaining the linearly polarized light in parallel with the transmission axis 21 of the polarizer 3, rather than becoming circularly polarized light, and is reflected by the reflective film 5.

Then, having passed through the quarter-wave plate 8 again, the light 42c is again front-scattered by the twist PDLC layer 11. Since still remaining the linearly polarized light parallel with the transmission axis 21 of the polarizer 3, the scattered light 42d can pass through the polarizer 3, thereby bright white representation is realized.

Figure 4:
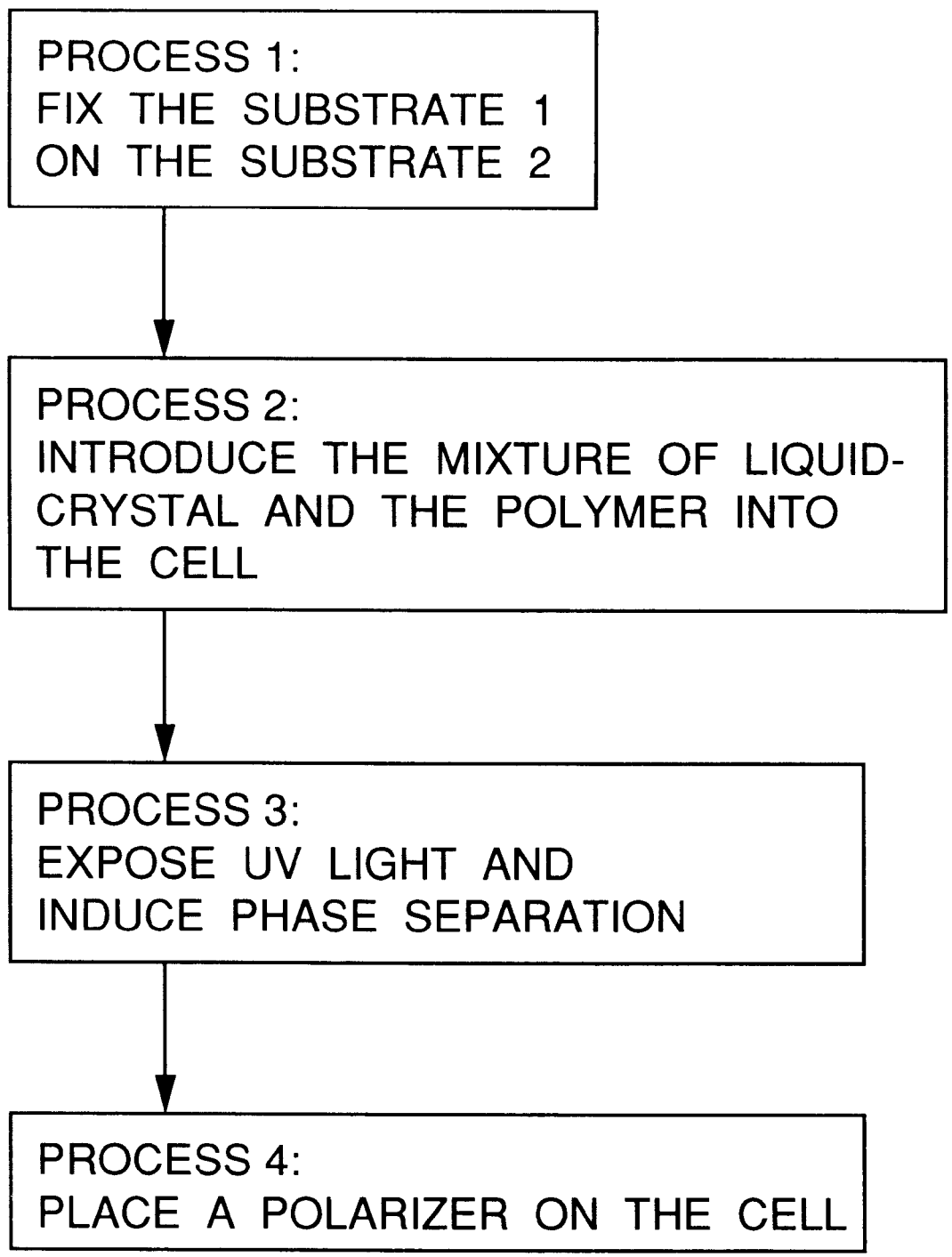
FIG. 4 is a flow chart illustrating the fabrication process of the preferred embodiments 1 and 2 of the present invention.

Referring now to FIG. 4, the manufacturing method for a reflective liquid crystal display of the embodiment 1 is hereunder described. This manufacturing process, as given in FIG. 4, can be generally classified into four processing steps. First, a cell forming process is described. The transparent electrode film 4 made of ITO (Indium Tin Oxide) or the like is formed on the insulating substrate 1 that is made of an optically isotropic material such as a transparent glass substrate or polymer film. Next, the alignment film 6 made of a polyimide film or the like is formed on the surface of the transparent electrode film 4 by coating and baking, and then, is subjected to rubbing treatment along the direction 22 shown in FIG. 2.

Next, the reflective electrode film 5 made of aluminum or the like is formed on the insulating substrate 2 to be arranged as opposed to the insulating substrate 1. Then, the alignment film 7 made of a polyimide film is formed on the reflective electrode film 5 by coating and baking, and then, is subjected to rubbing treatment along the direction of slow phase axis 24 of the quarter-wave plate 8 shown in FIG. 2. To the alignment film 7 is applied a coating solution, as a starting material for the quarter-wave plate 8, obtained by dissolving a liquid crystalline monomer (commercial name RM207 from MERCK) in toluene as organic solvent, with a spin coater operated at 2000 rmp, then the coating solution is immobilized as it is polymerized by photopolymerization by means of baking and UV irradiation, thereby the quarter-wave plate 8 whose retardation value is 135 nm is formed. The polymerized liquid crystalline monomer may be replaced with a liquid crystalline polymer.

The alignment film 9 made of polyimide is formed on the so-formed quarter-wave plate 8 by coating and baking, and then, is subjected to rubbing treatment along the orientation direction 23 of the twist PDLC layer 11 shown in FIG. 2. The so-formed insulating substrate 1 and insulating substrate 2 are in parallel bonded together via the interspacing sealing member 10 to prepare a cell with a gap of 5.0 $\mu$m.

Next, the process for injecting the liquid crystal and liquid crystalline polymer is hereunder described. A liquid crystal (commercial name TL213 from MERCK, Δ n=0.213) and liquid crystalline polymer (commercial name Mixture C from Dainippon Ink and Chemicals, Inc.) are blended together at a ratio of 90:10. A photopolymerization initiator (commercial name Irgacure 369 from Ciba-Geigy Ltd.) is mixed into this resultant compatible system by an amount of 0.1 wt %. During this procedure, a small amount of left-hand chiral material suitable for the gap of 5.0 $\mu$m and twist angle of 45 degrees may be added. The so-prepared compatible solution involving the liquid crystal, liquid crystalline polymer and photopolymerization initiator is injected by vacuum injection technique into the cell prepared in the previous process.

Next, the photopolymerization process is hereunder described. The liquid crystal cell prepared in the previous process is irradiated with a UV ray through the insulating substrate 1 under the conditions of an exposure power of 9 mW/$^2$ (405 nm) and an exposure time of 300 seconds (exposure energy=2700 mJ/m$^2$) to allow the liquid crystalline polymer to be photopolymerized.

Then, according to the geometrical arrangement in FIG. 2, the polarizer 3 is glued onto the insulating substrate 1, and a drive circuitry is installed to and around the cell.

Next, the electrooptical performance of the reflective liquid crystal display device in the embodiment of the present invention was evaluated.

Figure 5:
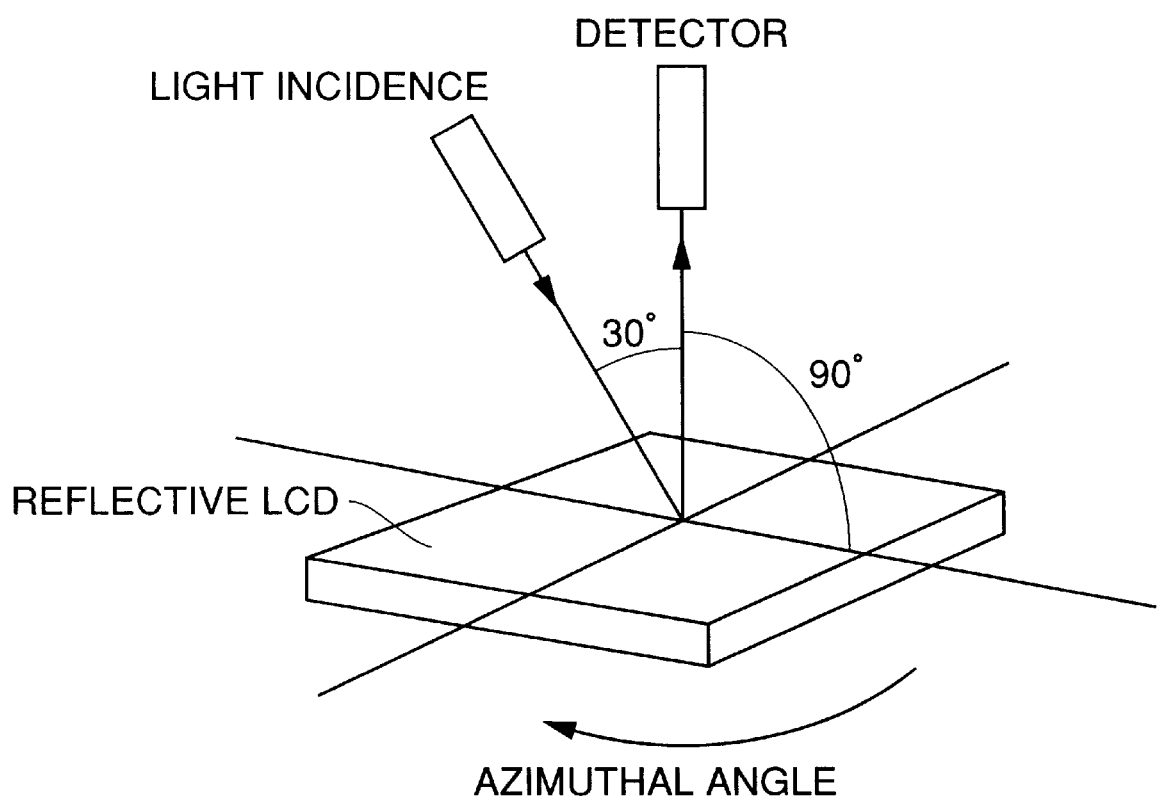
FIG. 5 is a schematic drawing of an evaluation system used to evaluate the performance of a reflective liquid crystal device of the invention.

FIG. 5 schematically illustrates a measuring equipment that was used to evaluate the performance of the reflective liquid crystal display devices of the embodiment 1 and a comparative example 1 described below. In the measuring equipment, an incident light is thrown at an incident angle of 30 degrees to the reflective liquid crystal display device as a sample being evaluated, and a reflected light beam was detected by a detector located at a reflective angle of 0 degree. Because the twisted reverse mode PDLC can cause predominant scattering in a particular direction, the sample being evaluated can be rotated in the azimuthal angle direction.

Additionally, it is apparent that an active drive method or simple matrix drive method can be used to drive the display device of the present invention using an active device (such as a TFT device, MIM device).

Embodiment 2

The embodiment 2 of the present invention provides a reflective liquid crystal display device in which the quarter-wave plate is constructed of a combination of two optical phase plates, whose retardations are 135 nm and 270 nm, respectively.

Figure 8:
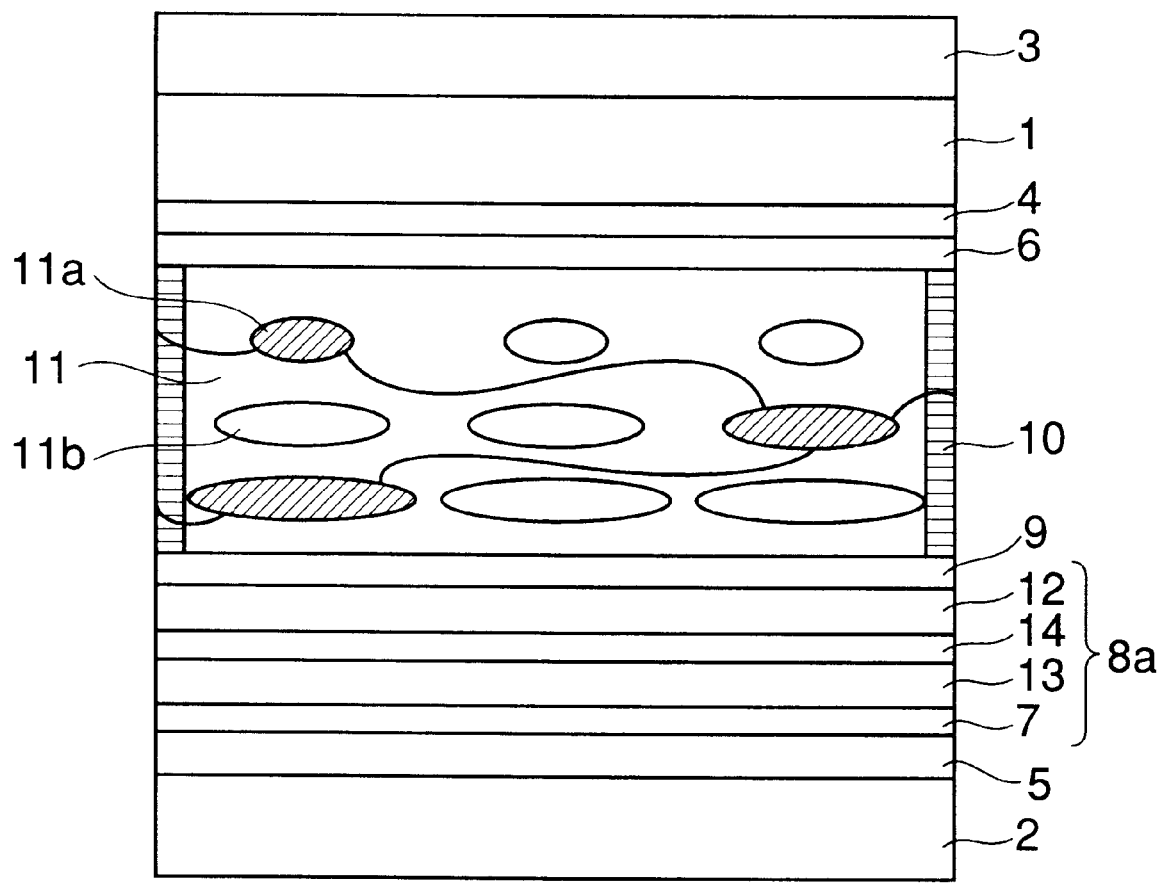
FIG. 8 is a cross-section of the reflective liquid crystal display device of the embodiment 2 of the present invention.

FIG. 8 gives a cross-sectional view of the structure of the device according to the embodiment 2 of the invention. Like the embodiment 1 shown in FIG. 1, the twist PDLC layer 11, quarter-wave plate 8a and reflective electrode film 5 are arranged in this order between the insulating substrate 1 and insulating substrate 2. But the quarter-wave plate 8a comprises a lamination of phase plates 12 and 13 with retardations of 270 nm and of 135 nm, respectively. Compared with the embodiment 1, the embodiment 2 can provide better black representation because the incident light having passed through the polarizer 3, twist PDLC layer 11 and quarter-wave film 8a is circularly polarized across a whole 400–700 nm region, which is the visible spectral region, before arriving at the reflective film.

Figure 9:
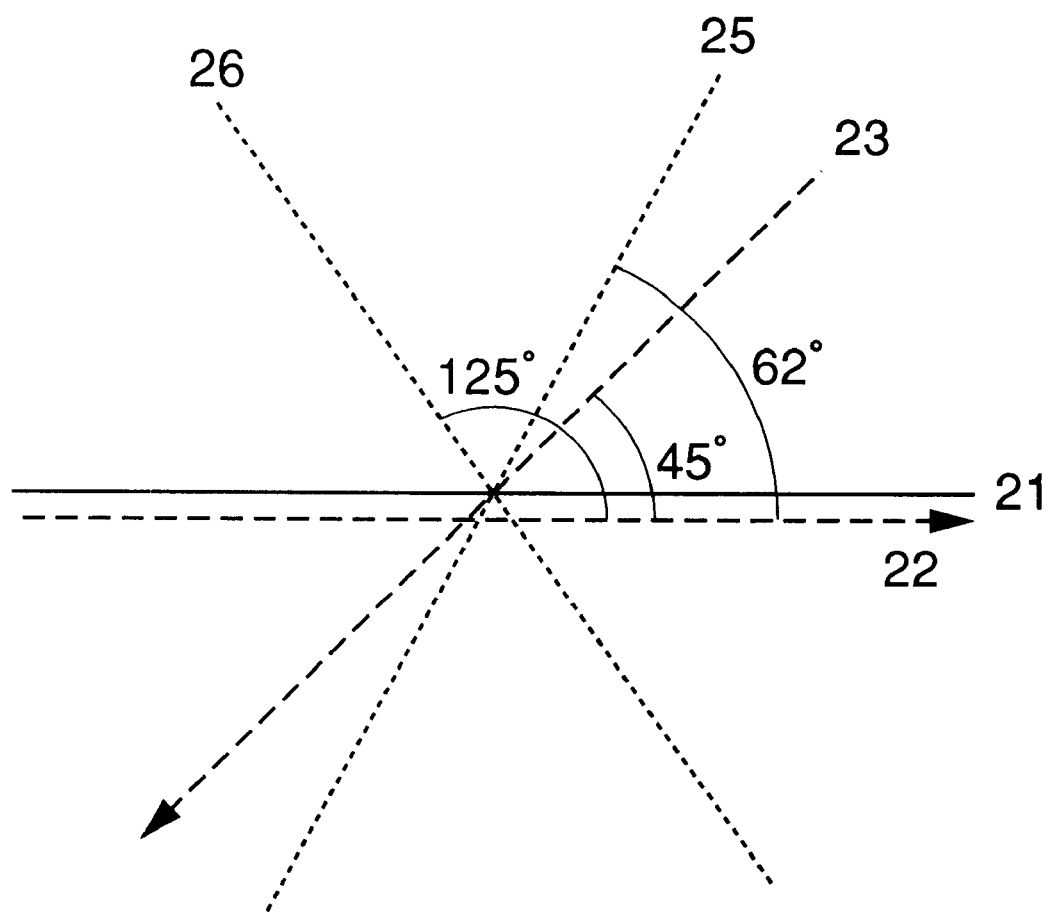
FIG. 9 is a layout drawing of the optical members and liquid crystal layer of the embodiment 2 of the present invention.

FIG. 9 illustrates an optical arrangement of the elements including the polarizer 3 and phase films as well as the liquid crystal layer according to the embodiment 2 of the present invention. When the transmission axis 21 of the polarizer 3 is set to 0 degree (i.e., horizontal line), rubbing treatment of the alignment films 6 and 9 is performed so that the orientation 22 of the liquid crystal molecules in the vicinity of the surface of insulating substrate 1 are oriented in the 0 degree direction and that the orientation 23 of the liquid crystal molecules in the vicinity of the surface of quarter-wave plate 8a, which is located above the insulating substrate 2 and comprises two phase plates whose retardation are 135 nm and 270 nm, are oriented in the 45 degrees direction. The phase plate 12 having a retardation of 270 nm, as one constituent of the quarter-wave plate 8a, is arranged so that its slow phase axis 25 is situated at 62 degrees, while the phase plate 13 having a retardation of 135 nm is arranged so that the direction of its slow phase axis 26 is situated at 125 degrees.

Next, the fabrication process according to the embodiment 2 of the present invention is hereunder described. Firstly, on the reflective electrode film 5 made of aluminum or the like in a manner similar to that for the embodiment 1, the alignment film 5 made of polyimide is formed, and then, is subjected to rubbing treatment along the direction 26 of slow phase axis of the phase plate 13 having a retardation of 135 nm shown in FIG. 9. To the alignment film 7 is applied a coating solution, as a starting material for the phase film, obtained by dissolving liquid crystalline monomer (commercial name RM207 from MERCK) in toluene as organic solvent, with a spin coater operated at 2000 rmp, then the coating solution is immobilized as it is polymerized by photopolymerization by means of baking and UV irradiation, thereby the phase plate 13 whose retardation value is 135 nm is formed.

Next, another alignment film is formed on the phase plate 13 by coating and baking, and then, is subjected to rubbing treatment along the direction 25 shown in FIG. 9. To the oriental film is applied a coating solution, as a starting material for the phase film, obtained by dissolving liquid crystalline monomer (commercial name RM207 from MERCK) in toluene as organic solvent, with a spin coater operated at 1000 rmp, then the coating solution is immobilized as it is polymerized by photopolymerization by means of baking and UV irradiation, thereby the phase plate 12 whose retardation is 270 nm and whose slow phase axis is oriented in the direction 25 is formed. Then, the orientation 9 made of polymide is formed on the phase plate 12 by coating and baking, and is subjected to rubbing treatment along the orientation 23 of the liquid crystal molecules to the insulating substrate 2 side shown in FIG. 3.

The so-formed insulating substrate 1 and insulating substrate 2 are parallely bonded together via the interspacing sealing member 10 to prepare a cell with a gap of 5.0 $\mu$m.

Next, the process for injecting the liquid crystal and liquid crystalline polymer is hereunder described. A liquid crystal (commercial name TL213 from MERCK, $\Delta n=0.213$) and liquid crystalline polymer (commercial name Mixture C from Dainippon Ink and Chemicals, Inc.) are blended together at a ratio of 90:10. A photopolymerization initiator (commercial name Irgacure 369 from Ciba-Geigy Ltd.) is mixed into this resultant compatible system by an amount of 0.1 wt %. During this procedure, a small amount of left-hand chiral material suitable for the gap of 5.0 $\mu$m and twist angle of 45 degrees may be added. The so-prepared compatible solution involving the liquid crystal, liquid crystalline polymer and photopolymerization initiator is injected by vacuum injection technique into the cell prepared in the previous process.

Next, the photopolymerization process is hereunder described. The liquid crystal cell prepared in the previous process is irradiated with a UV ray through the insulating substrate 1 under the conditions of exposure power of 9 mW/m$^2$ (405 nm) and an exposure time of 300 seconds (exposure energy=2700 mJ/m$^2$) to allow the liquid crystalline polymer to be photopolymerized.

Then, according to the geometrical arrangement in FIG. 9, the polarizer 3 is glued onto the insulating substrate 1, and a drive circuitry is installed to and around the cell.

Figure 10:
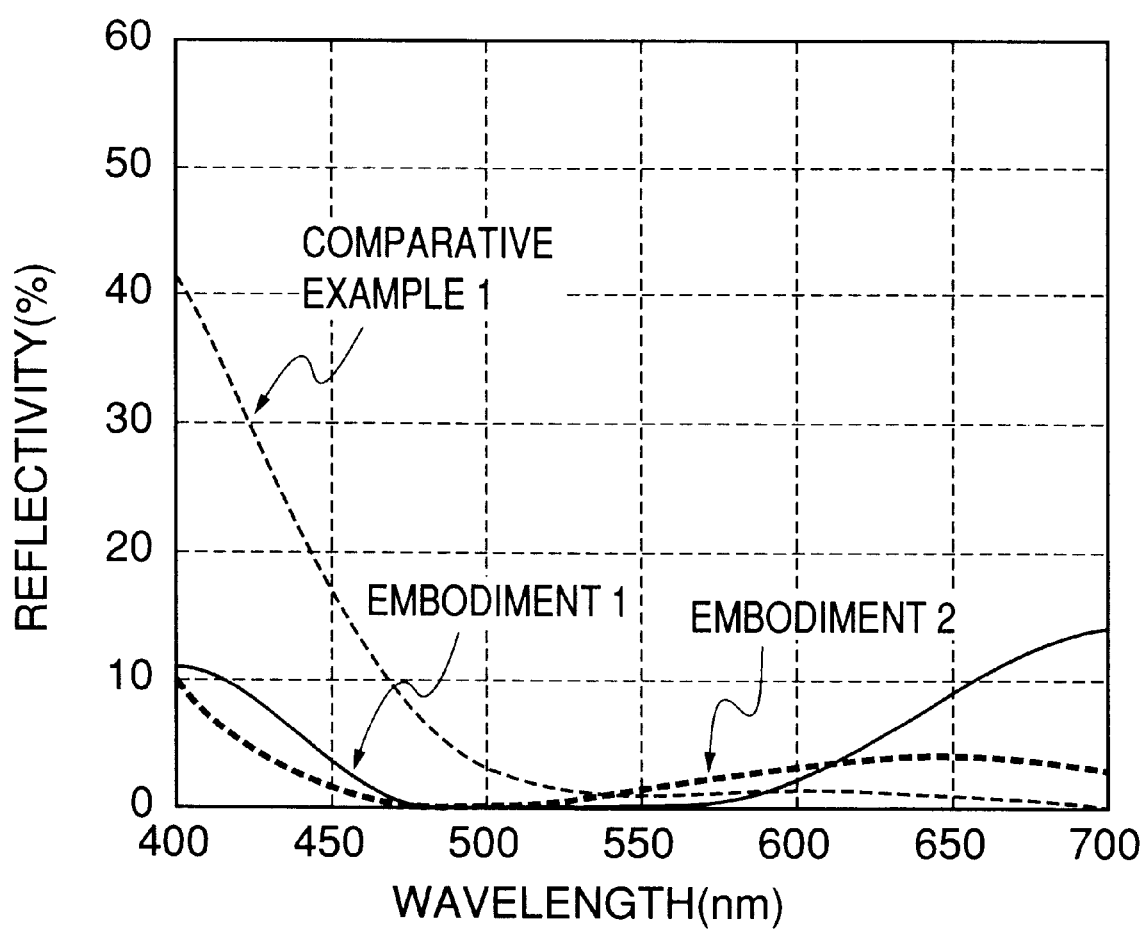
FIG. 10 is a graphical plotting of the wavelength distribution with black representation with the embodiments 1 and 2 of the invention and the comparative example 2.

FIG. 10 demonstrates the wave length distribution characteristics of the device described in the embodiment 2 of the present invention, by comparing them with those of the embodiment 1 of the invention and a comparative example 1 described below. It is apparent that broading the band for quarter-wave plate greatly improves black representation state.

Comparative Example 1

For the comparative example 1, a reflective liquid crystal display device below was fabricated.

First, a pair of insulating substrates were fabricated in a manner identical to that of the embodiment 1 of the present invention, and they were bonded together via an interspacing sealing member such that the twist angle with the liquid crystal was 45 degrees and the cell gap was 5 $\mu$m. Next, a liquid crystal (commercial name MS93392 from MERCK, $\Delta n=0.145$) and liquid crystalline polymer (commercial name Mixture C from Dainippon Ink and Chemicals, Inc.) were blended together at a ratio of 90:10. A photopolymerization initiator (commercial name Irgacure 369 from Ciba-Geigy Ltd.) was mixed into this resultant compatible system by an amount of 0.1 wt %, and then, the mixture was injected by a vacuum injection technique into the liquid crystal cell, thereby a reflective liquid crystal display device was fabricated according to a fabrication process identical to that of the embodiment 1 of the present invention.

Figure 6:
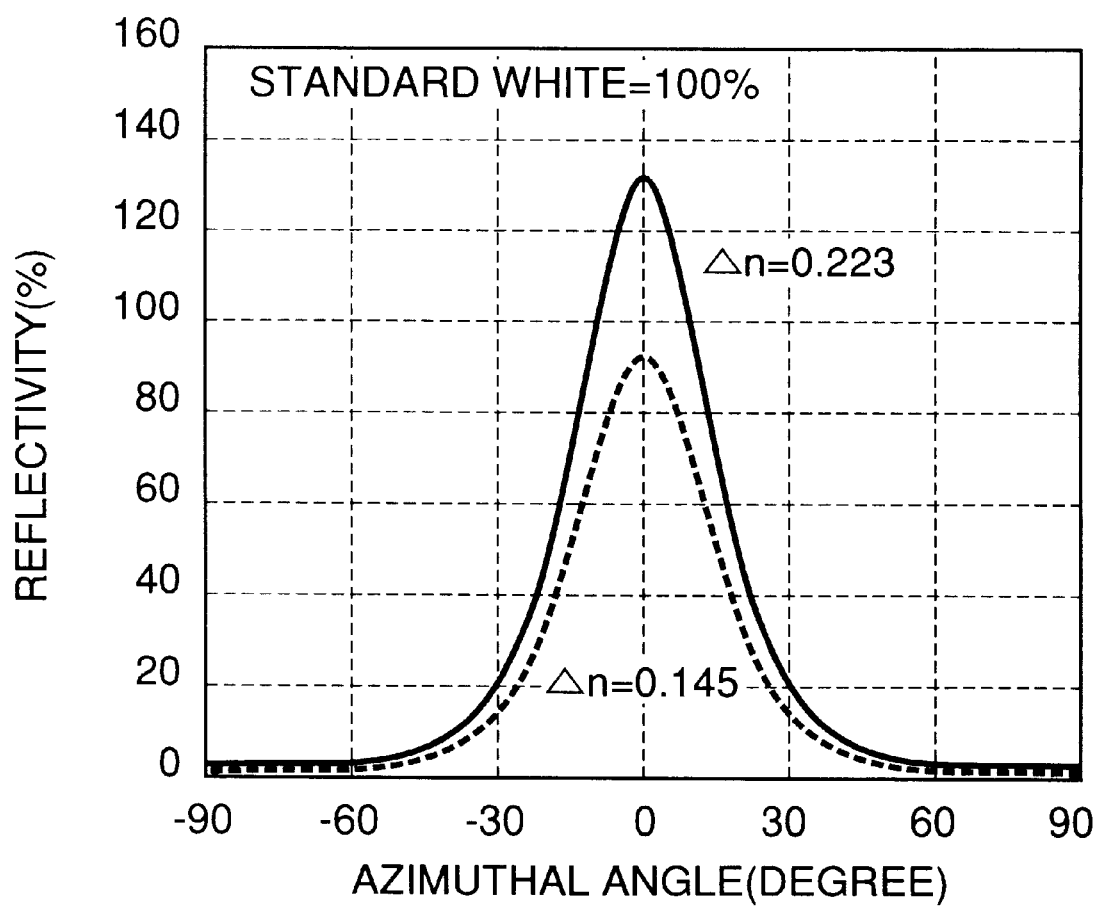
FIG. 6 is a diagram illustrating the measurement results of dependency of maximum reflectivity on azimuthal angle, with the embodiments of the invention and the comparative example.

FIG. 6 gives comparison of the dependency in reflectivity (%) vs. the variation in azimuthal angle the reflective liquid crystal display of the embodiment 1 of the present invention and that of the comparative example 1, to which an effective voltage of approximately 10 VAC at 60 Hz is applied. Additionally, Table 2 summarizes the electro-optical performance of the reflective liquid crystal display devices of the embodiments 1 and 2 of the present invention in comparison with that of the comparative example 1.

TABLE 2

|  | Liquid crystal material used | Reflectivity (white representation) (60 Hz, 10 V) | Reflectivity (black representation) (60 Hz, 1 V) | Contrast |
| --- | --- | --- | --- | --- |
| Embodiment 1 | MERCK TL213 ($\Delta n = 0.223$) | 125.0% | 2.0% | 63 |
| Embodiment 2 | MERCK TL213 ($\Delta n = 0.223$) | 125.0% | 1.6% | 78 |
| Comparative Example 1 | MERCK MS93392 ($\Delta n = 0.145$) | 95.0% | 2.0% | 47 |

The reflectivity with standard white plate is taken as 100%.

At an azimuthal angle where the reflectivity is greatest, the liquid crystal display of the embodiment 1 exhibits a reflectivity of 125% (relative to that of standard white plate as 100%). In contrast, the reflectivity achieved by the reflective liquid crystal display device of the comparative example 1 is 95%. To sum up, the reflectivity with the liquid crystal display device of the embodiment 1 is more than 30% greater compared with the device of the comparative example 1.

Incidentally, the reflectivity measurement for black representation is 2% with both the embodiment 1 of the invention and the comparative example 1. With the embodiment 1, the quality of black representation is equivalent to that of the comparative example 1, but that of white representation is approximately 30% or more greater compared with the comparative example 1. As a result, in contrast ratio, which is a ratio of the reflectivity with white representation to that with black representation, the embodiment 1 of the invention is greater than the comparative example 1.

With the embodiment 2 of the invention, the quality of black representation is further improved by using the wide-band quarter-wave plate, thereby much higher contrast is obtained. In other words, the reflective liquid crystal display device of the embodiment 1 of the invention using a high $\Delta n$ achieves greater brightness and higher contrast compared with the comparative example 1. According to the present invention, the reflective liquid crystal display device based on light scattering with a single polarizer and twist PDLC can incorporate a high Δn liquid crystal material, thereby a reflective liquid crystal display of greater brightness and higher contrast has been realized.

Embodiment 3

Figure 1:
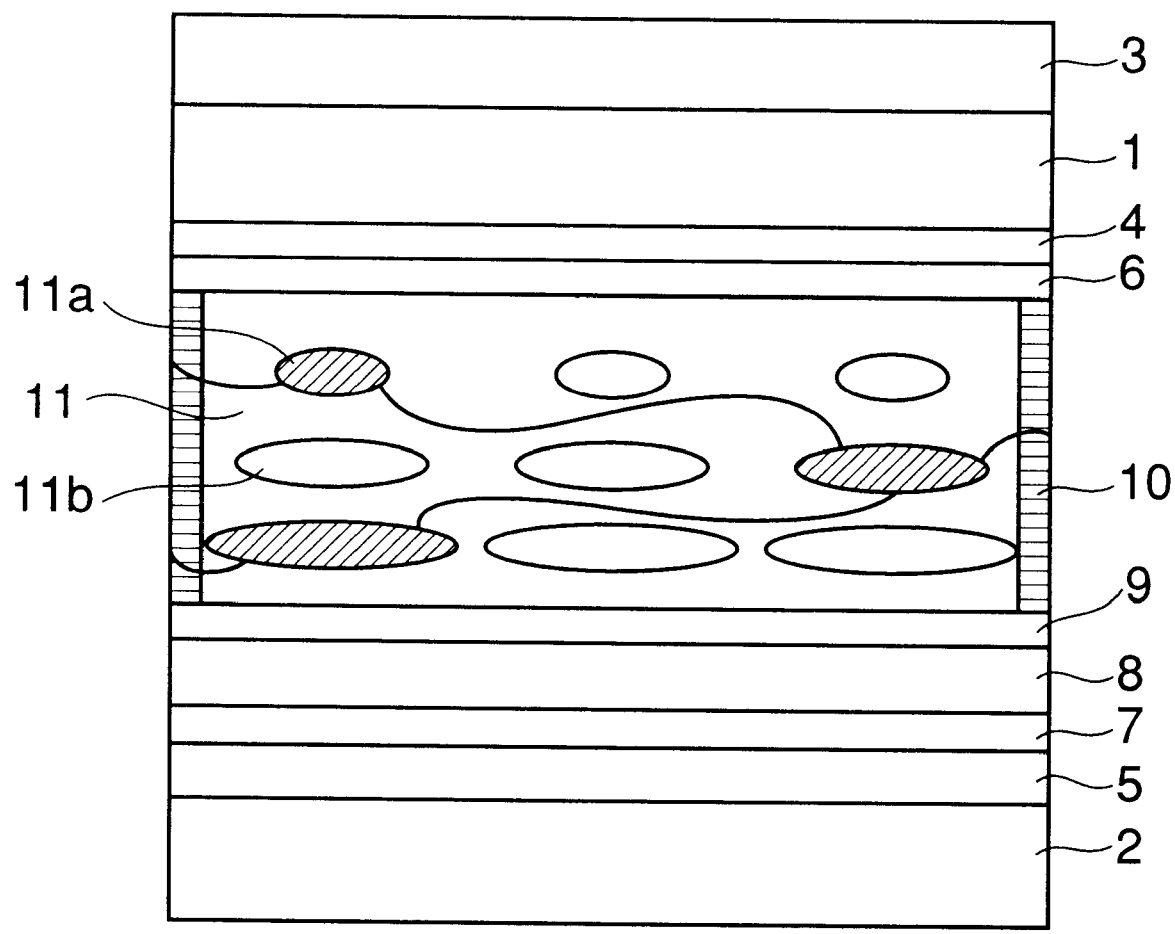
FIG. 1 is a cross-section of a reflective liquid crystal display device of the embodiment 1 of the invention.
Figure 11:
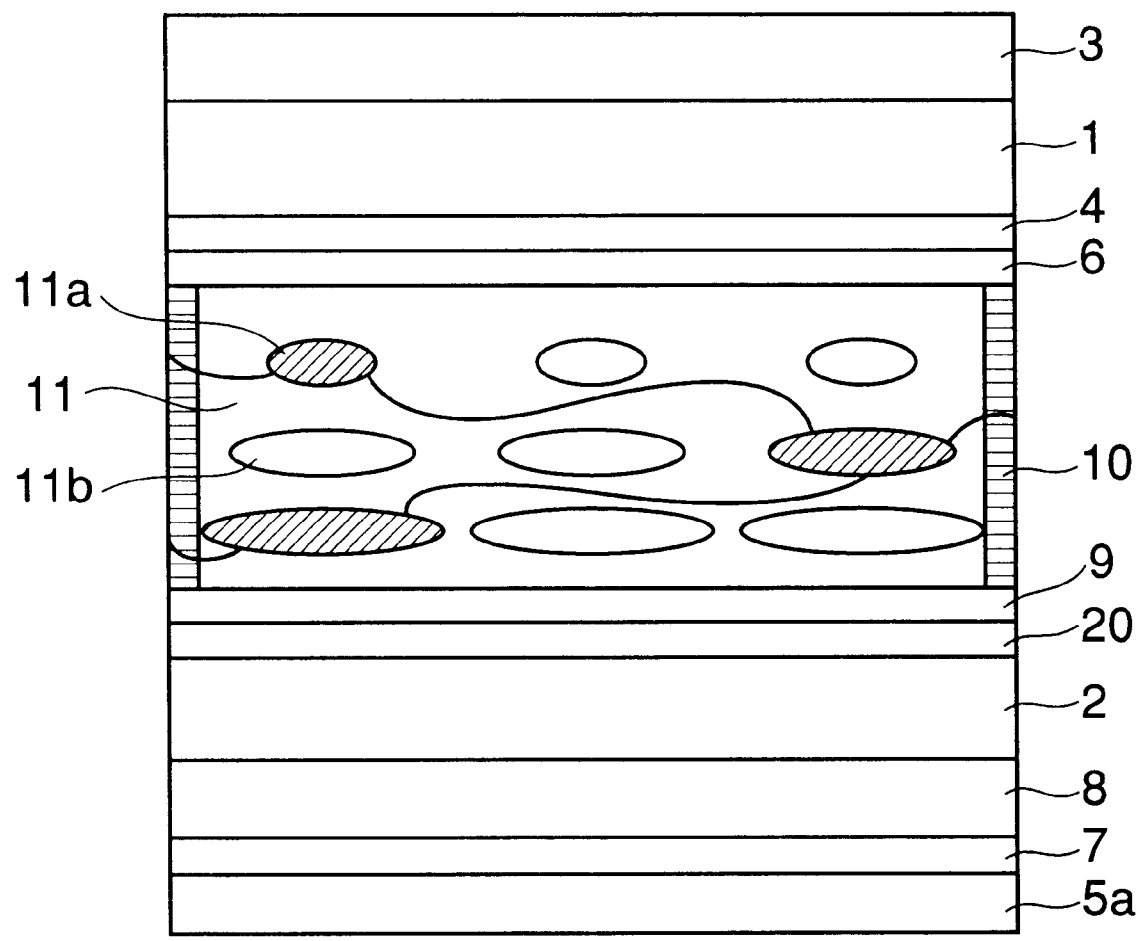
FIG. 11 is a cross-section of a reflective liquid crystal display device of the embodiment 3 of the invention.

FIG. 11 shows a cross-section view of the structure of a display device according to the embodiment 3 of the invention. In the display device shown in FIG. 11, the quarter-wave plate 8, alignment film 7 and reflective electrode film 5 shown in FIG. 1 are replaced with a transparent electrode film 20, a reflective film 5a is disposed on the opposite side of the substrate 2, and the quarter-wave plate 8 and alignment film 7 are interposed between the substrate 2 and reflective film 5a. The transparent electrode film 20 is made of ITO and the reflective film 5a is made of aluminum or the like. The other elements of the embodiment 3 have the same structures as those of the embodiment 1.

A driving voltage is applied to the transparent electrode films 4 and 20. The driving voltage is lower than that of the first embodiment because there is no element between the twist PDLC layer 11 and the transparent electrode film 20 except for the alignment film 9.

The embodiment 3 also has the same optical characteristics as the embodiment 1 and provides such greater brightness and higher contrast as the embodiment 1.

The present invention provides a high-performance reflective liquid crystal display device of greater brightness and higher contrast by utilizing both strong scattering effect in a particular direction and scattering effect capable of maintaining a plane of polarization, of a twisted reverse mode PDLC in a particular direction and scattering, and by combining optical members including a single polarizer, quarter-wave plate and reflective film. More specifically, according to the present invention, optical rotating power of a liquid crystal layer can be utilized for display principle with a liquid crystal display device by setting the twist angle of a twisted reverse mode PDLC liquid crystal layer within a range of 45°+90° n±10° (n is an integer), thereby both bright white representation and satisfactory black representation can be attained.

What is claimed is:

1. A reflective liquid crystal display device comprising:
   first and second substrates opposed to each other;
   a liquid crystal layer sandwiched between the first and second substrates, the liquid crystal layer including a polymer-dispersed liquid crystal containing a liquid crystal and a liquid crystalline polymer;
   a transparent electrode interposed between the first substrate and liquid crystal layer;
   a quarter-wave plate interposed between the liquid crystal layer and second substrate;
   a reflective electrode interposed between the quarter-wave plate and second insulating substrate; and
   a polarizer disposed on the opposite side of the first substrate from the liquid crystal layer;
   wherein the liquid crystal and the liquid crystalline polymer are twisted in molecule alignment so as to have a twist angle X represented by
   X=(45°+90° n)±10° (n=0 or a positive integer).

2. The device of claim 1, wherein one of the first and second substrates comprises an alignment film in contact with the liquid crystal layer, the alignment film aligning the liquid crystal molecules in an orientation coinciding with a transmission axis of the polarizer.

3. The device of claim 1, wherein one of the first and second substrates comprises an alignment film in contact with the liquid crystal layer, the alignment film aligning the liquid crystal molecules in an orientation, with an angle of 45°±10° formed between the orientation and one of fast and slow axes of the quarter-wave plate.

4. The device of claim 1, wherein the liquid crystal layer has a retardation value larger than a wave length of visible radiation.

5. The device of claim 1, wherein the quarter-wave plate is formed by immobilizing a liquid crystalline polymer or a precursor of a liquid crystalline polymer.

6. The device of claim 1, wherein the quarter-wave plate includes at least two wave plates which differ in retardation value.

7. A method for manufacturing the device of claim 1, comprising the steps of:
   making a mixture by mixing a liquid crystal with a liquid crystalline monomer or oligomer;
   aligning orientations of the liquid crystal and liquid crystalline monomer or oligomer in the same direction;
   performing a cure and phase separation of the mixture by irradiating the mixture with an activating light beam; and
   thereby polymerizing the liquid crystalline monomer or oligomer to form a polymer-dispersed liquid crystal having a network structure.

8. A reflective liquid crystal display device comprising:
   first and second substrates opposing to each other;
   a liquid crystal layer sandwiched between the first and second substrates, the liquid crystal layer including a polymer-dispersed liquid crystal containing a liquid crystal and a liquid crystalline polymer;
   a first transparent electrode interposed between the first substrate and liquid crystal layer;
   a second transparent electrode interposed between the second substrate and liquid crystal layer;
   a polarizer disposed on the opposite side of the first substrate from the liquid crystal layer;
   a reflective plate disposed on the opposite side of the second substrate from the liquid crystal layer; and
   a quarter-wave plate interposed between the second substrate and the reflective plate;
   wherein the liquid crystal molecules and the liquid crystalline polymer are twisted in molecule alignment so as to have a twist angle X represented by
   X=(45°+90° n)±10° (n=0 or a positive integer).

9. A reflective liquid crystal display device comprising:
   a liquid crystal layer in a cell;
   a polarizer disposed in front of the liquid crystal layer;
   a reflector disposed behind the liquid crystal layer; and
   a quarter-wave plate disposed between the liquid crystal layer and the reflector,
   the liquid crystal layer including a liquid crystal and a liquid crystalline polymer which are twisted in molecule alignment so as to have a twist angle X represented by
   X=(45°+90° n)±10° (n=0 or a positive integer).

* * * * *